US008336042B2

(12) United States Patent
Touati et al.

(10) Patent No.: US 8,336,042 B2
(45) Date of Patent: Dec. 18, 2012

(54) SYSTEM AND METHOD FOR MANAGING DATA ORIGINATING FROM AND DESTINED FOR A MOTOR VEHICLE

(75) Inventors: Monique Touati, Boulogne-Billancourt (FR); Aurelien Ferrand, Paris (FR)

(73) Assignee: Renault S.A.S., Boulogne-Billancourt (FR)

( * ) Notice: Subject to any disclaimer, the term of this patent is extended or adjusted under 35 U.S.C. 154(b) by 464 days.

(21) Appl. No.: 12/532,649

(22) PCT Filed: Mar. 21, 2008

(86) PCT No.: PCT/FR2008/050504

§ 371 (c)(1),
(2), (4) Date: Dec. 31, 2009

(87) PCT Pub. No.: WO2008/132396

PCT Pub. Date: Nov. 6, 2008

(65) Prior Publication Data

US 2010/0115505 A1 May 6, 2010

(30) Foreign Application Priority Data

Mar. 23, 2007 (FR) ..................................... 07 53994

(51) Int. Cl.
*G06F 9/44* (2006.01)
*G06F 15/16* (2006.01)
*G06F 7/00* (2006.01)
*G06F 11/30* (2006.01)
*G01M 17/00* (2006.01)
*G08C 19/12* (2006.01)

(52) U.S. Cl. ... 717/171; 701/29.3; 701/31.4; 340/13.24; 340/13.25; 709/204; 709/208; 709/248

(58) Field of Classification Search ................ 701/2, 24, 701/29.1, 29.3, 29.6, 31.4, 31.5, 32.3, 32.5, 701/32.6, 33.2, 33.3, 33.4, 34.2, 115, 430; 709/22, 201, 204, 208, 248; 340/1.1–16.1; 370/503; 726/3; 717/168, 171, 176; 715/733–759; 712/31; 710/110; 707/770
See application file for complete search history.

(56) References Cited

U.S. PATENT DOCUMENTS 6,556,904 B1 4/2003 Larson et al.
(Continued)

FOREIGN PATENT DOCUMENTS

DE 10 2004 050846 4/2006
(Continued)

OTHER PUBLICATIONS

Calgary Herald, "Bluetooth Controller comes to the rescue", Aug. 18, 2006, canada.com.*

(Continued)

*Primary Examiner* — Khoi Tran
*Assistant Examiner* — Abby Lin
(74) *Attorney, Agent, or Firm* — Oblon, Spivak, McClelland, Maier & Neustadt, L.L.P.

(57) ABSTRACT

A system for managing data originating from and destined for a motor vehicle, including: a first data communication unit permanently disposed on-board the vehicle; a second data communication unit disposed at a distance from the vehicle; and at least two devices for transmitting, receiving and storing data originating from and destined for the vehicle, the device communicating data with the first and second communication units, interfacing with a user of the vehicle and including a data storage. The second communication unit can be a computer terminal connected to a computer network, such as the Internet and/or an intranet, providing access to an interactive computer application, such as to transmit data originating from the vehicle and to receive the data destined for the data transmission, reception and storage devices and the vehicle. The storage devices can synchronize non-custom data that have become obsolete.

21 Claims, 4 Drawing Sheets

U.S. PATENT DOCUMENTS

| | | | | |
|---|---|---|---|---|
| 6,748,536 | B1 | 6/2004 | Madau | |
| 6,959,235 | B1 * | 10/2005 | Abdel-Malek et al. | 701/29.4 |
| 7,006,914 | B1 * | 2/2006 | Cahoon | 701/115 |
| 7,139,660 | B2 * | 11/2006 | Sarkar et al. | 701/36 |
| 7,257,426 | B1 | 8/2007 | Witkowski et al. | |
| 7,679,490 | B2 * | 3/2010 | Hammes | 340/426.15 |
| 8,041,779 | B2 * | 10/2011 | Habaguchi et al. | 709/219 |
| 2002/0197955 | A1 | 12/2002 | Witkowski et al. | |
| 2003/0109972 | A1 | 6/2003 | Tak | |
| 2003/0228879 | A1 | 12/2003 | Witkowski et al. | |
| 2004/0230348 | A1 | 11/2004 | Mann et al. | |
| 2005/0043869 | A1 * | 2/2005 | Funkhouser et al. | 701/29 |
| 2005/0102074 | A1 * | 5/2005 | Kolls | 701/29 |
| 2006/0030983 | A1 | 2/2006 | Bautista | |
| 2006/0049915 | A1 * | 3/2006 | Deniau et al. | 340/5.72 |
| 2006/0173587 | A1 * | 8/2006 | Oesterling et al. | 701/2 |
| 2006/0265117 | A1 * | 11/2006 | Cahoon | 701/114 |
| 2007/0028089 | A1 | 2/2007 | Yukawa et al. | |
| 2007/0100513 | A1 * | 5/2007 | Asano | 701/2 |
| 2008/0027602 | A1 * | 1/2008 | Yeap et al. | 701/29 |
| 2008/0045274 | A1 | 2/2008 | Witkowski et al. | |
| 2008/0228852 | A1 | 9/2008 | Husa et al. | |
| 2010/0063670 | A1 * | 3/2010 | Brzezinski et al. | 701/33 |
| 2010/0114616 | A1 | 5/2010 | Touati | |

FOREIGN PATENT DOCUMENTS

| | | | |
|---|---|---|---|
| EP | 1 116 840 | | 7/2001 |
| EP | 1 138 563 | A1 | 10/2001 |
| EP | 1 748 394 | | 1/2007 |
| FR | 2 792 754 | | 10/2000 |
| WO | 00 72463 | | 11/2000 |
| WO | 01 80049 | | 10/2001 |
| WO | 2005 069131 | | 7/2005 |
| WO | 2006 132534 | | 12/2006 |

OTHER PUBLICATIONS

“Control Your Car with Your Mobile Phone”, Jul. 25, 2006, Cellphonenews.com.*

* cited by examiner

SYSTEM AND METHOD FOR MANAGING DATA ORIGINATING FROM AND DESTINED FOR A MOTOR VEHICLE

TECHNICAL FIELD

The present invention relates to a system for managing data originating from and going to a motor vehicle, incorporating a transmission, reception and storage device for these same data. The invention also relates to a method for managing data originating from and going to a motor vehicle, by means of a data transmission, reception and storage device.

Currently, the user is faced with an increasing mass of information relating to his motor vehicle. This information, appearing in very diverse and disparate forms, may be lost, forgotten or interpreted partially and insufficiently by the user himself or by the network of the manufacturer of this vehicle.

A first source of information consists of various documents that exist in paper form, such as the user manual, the service handbook and the various contracts. The purchase of the vehicle, the uses, the services, the repairs, the resale and any relations with the network of the manufacturer are most frequently noted in these documents. Therefore, with the exception of these few documents, which are moreover not always customized, nor systematically updated, the users cannot monitor the life of the vehicle.

A second source of information originates from the various sensors, computers and members capable of giving information on the state of the vehicle and of helping to establish a diagnosis of said vehicle. This information is available to the network of the manufacturer only when the vehicle is brought into the workshop for maintenance or a repair. The workshop can therefore not anticipate the seriousness of the incident, or the workload, before the user arrives.

Another source of information is formed by all of the programmings, adjustments and customized services (seats, radio, air conditioning, etc.) established by the user. Conventional car radios, including a compact disc (CD) player, are beginning to be adapted to the personal means and objects in order to have music, known as MP3 players (using audio files that are compressed according to the algorithm known under the abbreviation MP3), universal serial bus keys (known under the abbreviation USB) and even more.

Other information, such as road maps, are also used by the user on his journeys. He can for example print out an itinerary on a specialized Internet site, but it is not easy, and even dangerous, to use while driving. Onboard or portable devices, known as portable navigation devices (known under the abbreviation PND), or stand-alone GPS devices, using the global positioning system (known under the abbreviation GPS) are beginning to form part of the options of a vehicle or of the personal objects of the user which he uses in his vehicle with no real adaptation to the driving conditions in terms of comfort and safety.

The updating of the onboard navigation devices, of the information associated with navigation (maps, parking lots, radars, etc.) via dedicated physical media (CD, DVD) and of the personal information associated with journeys (the user's address book) is difficult and costly. Moreover, the cost of telematic and communication equipment of the offboard navigation means, which would make it easy to update, remains high. Moreover, a portion of the information available in the vehicle (GPS position, etc.) could be useful when the user is out of his vehicle or moving around. For example, the information on the GPS position could be useful when he needs to find his vehicle or the information on the status of the openings would allow him to check that his vehicle is properly locked.

Currently, the user cannot take advantage of the user-friendliness and of the ergonomic elements provided by his terminal, personal computer (PC) for everything concerning the management of his vehicle, of his automobile mobility, with the settings and configurations, the knowledge of the use of his vehicle, the preparation of a trip or a journey.

An aid for the maintenance of the vehicle and more generally for its use and its management is provided for the user by certain manufacturers via the user spaces placed online on the Internet. To access it, the user must himself declare the vehicle information including first of all the vehicle identification number (known under the abbreviation VIN). But this information is dependent on a declarative mode, is not dynamic and cannot be easily updated.

Finally, with respect to the vehicle key, unless he couples it permanently to a differentiating key ring, the user has difficulty in customizing it physically, in order to distinguish it from the second key of his vehicle and above all from all the keys that exist on the market for the same model.

PRIOR ART

There are already solutions making it possible, via a vehicle key, to make the vehicle communicate with user terminals and to do so in wired or wireless technologies.

According to documents US-2004/0.230.348, U.S. Pat. No. 7,006,914 and EP-1.138.563 a vehicle identification device in the form of a key or a badge is known. The badge comprises an electronic circuit containing a nonvolatile memory, incorporating on the one hand a coded identification function for authorizing starting, and on the other hand designed for the storage of information relating to the user of the vehicle and relating to the vehicle, its status and its operation. The nonvolatile memory may be read/written with the aid of a first reader, permanently placed onboard the vehicle, and with the aid of a second reader at a distance from the vehicle, the latter being associated with an information-processing system.

However, such a device remains inadequate in terms of memory and of information transmitted between the badge and the vehicle and between the badge and the information-processing system. Moreover, no connection to a computer network for transmitting the data to a network of the manufacturer is possible.

Document WO- 2005/069.131 describes a user-friendly interface making it easier to set preferences and other programmable parameters specific to a user. The interface is hosted by a server on an Internet network, easily accessible by the user. The settings made by this interface are stored and transferred first to a portable device of the USB key type, then to the vehicle.

However, the data interchanges are carried out only in one direction, from the interface to the portable device and then to the vehicle. Consequently, the data interchanges are relatively limited. Moreover, without a computer being able to connect to the Internet network, the user cannot directly access the information on his portable device. The latter is only a non-interactive data medium.

Also known, according to document FR-2.792.754, is a vehicle monitoring system comprising first of all at least one portable data medium that may take the form of a key or else a module furnished with a man-machine interface and a memory. The system also comprises at least one data communication device permanently placed in the vehicle for storing/retrieving data for two-way data communication with the data medium. The system finally comprises at least one data communication device at a distance from the vehicle for entry/retrieval of data for two-way data communication with the data medium. The operation of the vehicle is controlled by data loaded onto the medium by means of the data communication device attached to the vehicle and the data loaded by means of the data communication device attached to the vehicle are read from the data medium.

However, in such a system, the information transmitted by the data medium relates specifically to the identity of the user. It is therefore not possible to communicate information relating to the settings of the vehicle, for example in order to improve driving comfort. Moreover, the user of the vehicle cannot access the data stored and transmitted to the data communication device at a distance from the vehicle.

SUMMARY OF THE INVENTION

A main problem that the invention proposes to solve consists in perfecting a system for managing data originating from and going to a motor vehicle. A second problem is to optimize, thanks to a data transmission, reception and storage device, the multidirectional data transfers. A third problem consists in producing a device, incorporated into a data management system of a vehicle, making it possible to gain access to some or all of these same data. Yet another problem is to apply a data management method making it possible to cause the vehicle to communicate with a personal device of the user, and with a computer environment of the user and specific to the manufacturer.

The invention therefore relates to a system for managing data originating from and going to a motor vehicle, comprising:

- a first data communication unit permanently placed onboard the vehicle,
- a second data communication unit at a distance from said vehicle, and
- a device for transmitting, receiving and storing data originating from and going to said vehicle, having:
  - data communication means with the first and with the second communication unit,
  - means for interfacing with a user of said vehicle, and
  - means for storing the data, the second communication unit being a computer terminal connected to a computer network such as the Internet and/or an Intranet, providing access to an interactive computer application, so as to send data originating from the vehicle and to receive said data going to the data transmission, reception and storage device and to the vehicle, the data transmission, reception and storage device preferably being incorporated into a device substantially similar to a vehicle key, for example of the smartcard or chip card type, characterized in that the system comprises at least two data transmission, reception and storage devices capable of synchronizing noncustomized data that have become obsolete, by comparing data contained in the at least two data transmission, reception and storage devices, in the first communication unit and in the second communication unit, said synchronization being applied either by the first communication unit or by the second communication unit, or directly between them by communication being set up as soon as one of the at least two devices detects another thereof in its environment.

In other words, the system makes it possible simultaneously to cause the vehicle to communicate with the data transmission, reception and storage device and to manage information and data being transferred and using all the connection flexibility and user-friendliness of an application that can be accessed via a worldwide computer network or via a network specific to the manufacturer. The information transfers take place without it being necessary to have recourse to a telematic system onboard the vehicle, and therefore independently of a telecommunication network.

Furthermore, said synchronization occurs by comparing data sets, each set being characterized by the associated timestamp and/or mileage data. It should be noted that the synchronization comprises both the upgrading and the updating of the data. For example, a user having a key capable of operating with this system can update and upgrade a new software version or new data of his navigation system simply by connecting with this key to the interactive computer application without being concerned with knowing whether the version proposed by the interactive computer application is the latest relative to that of his vehicle.

The data transmission, reception and storage devices therefore operate as media for synchronizing the whole system and are themselves beneficiaries of the synchronization. The synchronization therefore allows the user of the system always to have the most comprehensive and the most up-to-date information irrespective of the data transmission, reception and storage device used.

Therefore a user will not have to worry about updating a key that he has not used for a long time; the latter will be automatically updated either by the vehicle, or by the other key, or during a connection to the interactive computer application.

The information stored in the device is protected in the interactive computer application. With the invention, the user of the vehicle, via his device operating as a portable personal automobile object, is the operator of the information system. The present invention makes it possible to upgrade, systematize and integrate the solutions for communication and synchronization between the various elements of the system (wireless and/or wired, uplink and/or downlink direction of communication), the various services offered to the user via this system and the associated device.

In a particularly favorable manner, a means of access from the data transmission, reception and storage device to the second communication unit can be provided by an identified and authenticated connection. The connection can allow access to the interactive computer application controlled by the manufacturer, so that a user can read, load and/or unload these data from the transmission, reception and storage device via its service portal and obtain services fed by this information and offered by the manufacturer.

Preferably, the connection of the data transmission, reception and storage device to the second communication unit may automatically initiate the launching of the interactive computer application hosted in the server and accessible from the second communication unit. The connection of the transmission device may be applied by the automatic documentation of at least one identifier, that of the vehicle (the VIN). A password associated with a user may have to be entered in order to authenticate his right of access to the interactive computer application controlled by the manufacturer. The connection between the transmission, reception and storage device and the second communication unit may be wired or wireless.

The transmission and reception of the data between the data transmission, reception and storage device and the second communication unit can be carried out at a distance from the vehicle, automatically, without intentional connection of said data transmission, reception and storage device. The transmission and reception of the data may be done, for example, by means of a wireless access point or a node of a mesh network.

The second communication unit can use at least two data protection means independent of one another. The first means can be a vehicle identifier (the VIN) that can be etched into the memory of the data transmission, reception and storage device. And, the second means can be a physical identifier of at least one part of the data transmission, reception and storage device, that may be etched into the memory of the device. The integrity of the data stored in the data transmission, reception and storage device may be ensured by the prohibition of direct read and write access to the data storage means.

According to a particular embodiment of the invention, the device may be an onboard software application in a communicating personal object, forming the second communication unit, or hosted on an application card designed to be received in a communicating personal object of the cellphone type, said application allowing the communicating personal object also to include control of access to the vehicle and of the immobilizer.

In practice, the device or the first unit of the vehicle communicate information in an "opportunist" manner, in which communication is possible, with at least one wireless access point and/or at least one node of a mesh network belonging to an infrastructure via wireless computer network technologies such as Wifi, Wimax, as soon as the node or the access point is detected. The terminal of the user thus gaining access to the information and to the service portal hosted in the server via an Internet connection.

The man-machine interfacing means of the data transmission, reception and storage device may comprise, alone or in combination, a speaker, a microphone, a vibrator, controls, a display, one or more light-emitting diodes, and yet other elements.

According to another aspect of the present invention, a use of a system, having one or more of the technical features described above, is characterized in that a vehicle fleet management system is supplied with the data originating from said connections of at least one data transmission, reception and storage device to an interactive computer application intended for vehicle fleet users or to any other terminal connected to a fleet management system and intended for managers of these fleets.

The system may be used to allow an after-sales network of the manufacturer to carry out a pre-diagnosis of a vehicle remotely.

The system may be used for updating, based on the data supplied by the interactive computer application hosted in a server, the systems onboard the vehicle. The data may comprise, for example, the latest update versions of the onboard software originating from the manufacturer's after-sales network or from the manufacturer itself, such as a software program of a computer or of a navigation system.

According to yet another aspect of the present invention, a method for managing data originating from and going to a motor vehicle, by means of a data transmission, reception and storage device, comprising:

- in transmitting and receiving data with the data transmission, reception and storage device to and from a first data communication unit permanently placed onboard the vehicle,
- in causing to be launched automatically by said data transmission, reception and storage device an interactive computer application hosted in a server of the manufacturer or another player, that can be accessed by a second communication unit of said data, that is at a distance from said vehicle and connected to a computer network,
- in transmitting and receiving said data with said data transmission, reception and storage device to and from the second communication unit, by the interactive computer application,
- in causing said data to be processed by said interactive computer application, and
- in storing with said device the data received from the first and said second communication unit.

Integrity of the data stored in the data transmission, reception and storage device may be ensured by prohibiting direct read and write access to the data storage means.

A means of access to the interactive computer application controlled by the manufacturer may be provided via an identified and authenticated connection. In this manner, a user may view, load, and/or unload the data of the transmission, reception and storage device via its service portal. In order to ensure the confidentiality of the data concerning the vehicle, these data may be encrypted by the service portal controlled by the manufacturer or by the first communication unit before being recorded in said data transmission, reception and storage device.

These data may then be decrypted by the service portal or by the first communication unit, when they are transferred to the user terminal or to the vehicle.

The step may include storing in the transmission, reception and storage device dynamic data received from the first communication unit in a memory of said data transmission, reception and storage device, on each stop and/or start of the vehicle, or following a vehicle event or a control operated by the user. The data may, for example, be of the type such as mileage traveled by the vehicle, date and time, starting and stopping of the engine, levels, warnings and defects, wear of components, status of openings, customized states and settings of the functions of the vehicle, GPS (Global Position Satellite) position or location of the vehicle in an infrastructure or any other information capable of changing over time and concerning the vehicle or its environment, and yet other data.

The step of storing in the transmission, reception and storage device static data received from the second communication unit or from a production line tool may be applied in a memory of said transmission, reception and storage device. The data may be, for example, technical, commercial, or legal characteristics of the vehicle.

The step of storing in the transmission, reception and storage device temporary data received from the second communication unit may be applied in a memory of said data transmission, reception and storage device. The data may be, for example, of the type including settings associated with the vehicle or service contracts taken out for the vehicle.

The step of storing in the transmission, reception and storage device historic data received from the first communication unit may be applied in a memory of said device on each appearance. The data may be, for example, of the type including history of the warnings and defects associated with the date, time and mileage data.

The step of storing in the transmission, reception and storage device historic data received from the second communication unit may be applied in a memory of said device. The data may be information providing access to the rights such as the manufacturer's warranty, after-sales service contracts and any other rights associated with the use or possession of a vehicle, servicing or maintenance operations, any after-sales intervention, or intervention associated with motor vehicle services, these data being associated with the date, time and mileage data.

The step of storing in the device buffer data received from the first and the second communication unit may be applied in a memory of said data transmission, reception and storage device. The data may be, for example, of the type including video, audio, text, image such as itineraries and interacting with navigation systems, audio or video systems, the onboard computer in order to carry out updates and corrections of onboard software programs and to load/display various information.

BRIEF DESCRIPTION OF THE DRAWINGS

The invention will be clearly understood and its various advantages and different features will better emerge during the following description, of the nonlimiting exemplary embodiment, with reference to the appended schematic drawings in which.

DETAILED DESCRIPTION OF PREFERRED EMBODIMENTS

Figure 1:
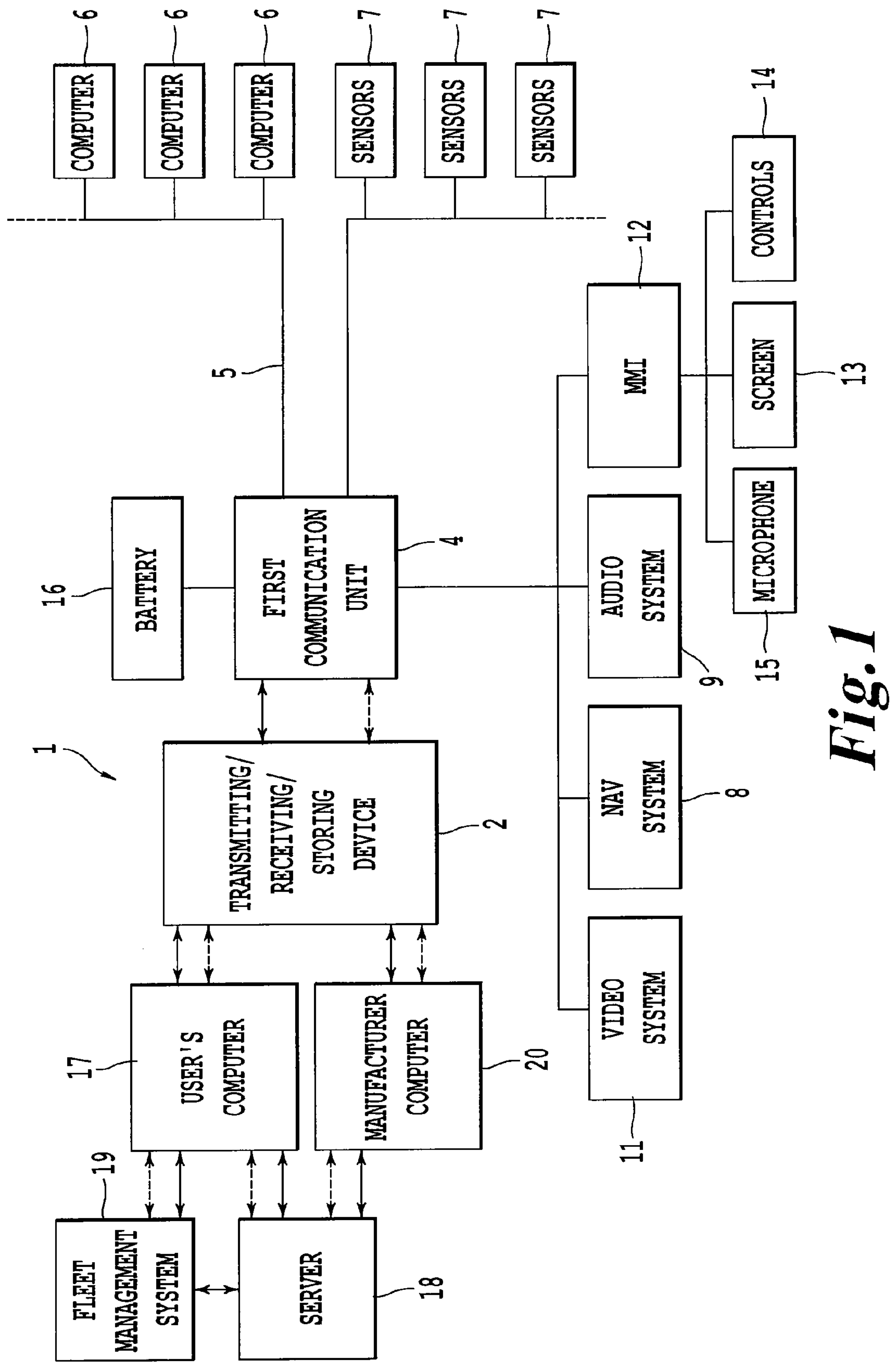
FIG. 1 represents a block diagram of the system for managing data originating from and going to a motor vehicle, according to the invention.
Figure 2:
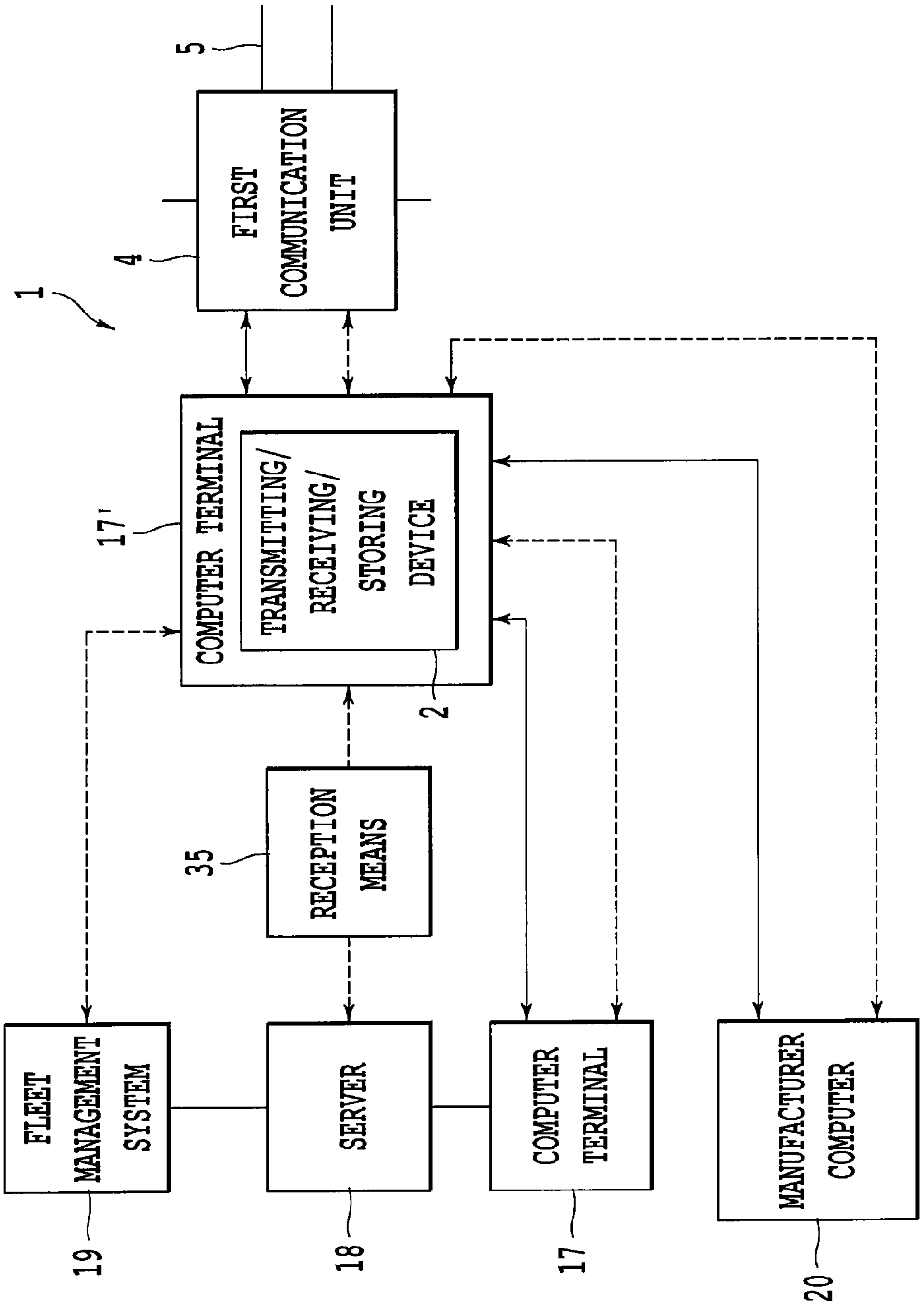
FIGS. 2 and 3 represent respectively partial views of a second and third embodiment of the system for managing data, according to the invention.
Figure 3:
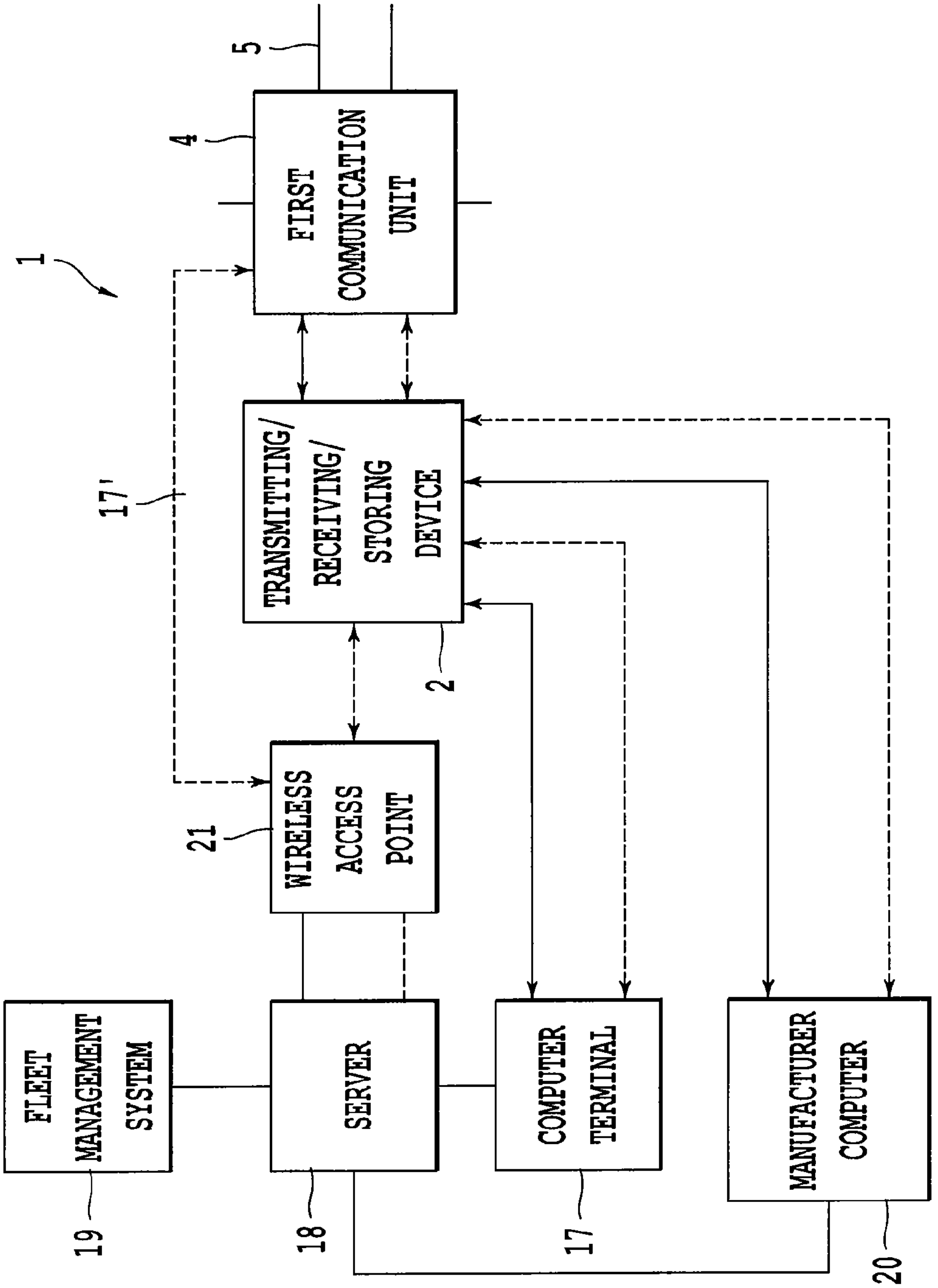

As illustrated in FIGS. 1 to 3, the system (1) for managing data originating from and going to a motor vehicle comprises a device (2) for transmitting, receiving and storing these data. This device (2) may be substantially similar to a vehicle key.

In the preferred embodiment, the device (2) is the vehicle key (2) known to those skilled in the art as a user badge or any other object that can fulfill these functions, such as a smart card. This key (2) provides the conventional functions of a vehicle key such as the management of the starting of the vehicle or of the immobilizer and of locking/unlocking, whether or not according to the hands-free principle. In the rest of the description, it will be referred to rather as the device (2).

First of all, the device (2) has communication means or modules (3) entering into communication with a first communication unit (4) onboard the vehicle. And reciprocally, the device (2) is capable of interfacing with this first unit (4), in wired communication technology (solid lines in FIGS. 1 to 3) and/or wireless communication technology (dashed lines in FIGS. 1 to 3). The first unit (4) uploads data from the serial system bus (5) (known under the abbreviation CAN, for "Controller Area Network"), originating from computers (6) or from sensors (7) not present on the CAN (5).

The first unit (4) is connected to various items of equipment of the vehicle, such as a navigation system (8), an audio system (9), a video system (11), a hard disk memory (not shown), and man-machine interfaces (12) (MMI), for interfacing with a user of the vehicle. The MMI comprises a screen (13), controls (14) and a microphone (15). The first unit (4) could be, for example, a passenger compartment central unit (PCCU), a microprocessor (known under the abbreviation CPU for "Central Processing Unit") or a telematic module. The first unit (4) is supplied by a battery (16) of the vehicle.

Figure 4:
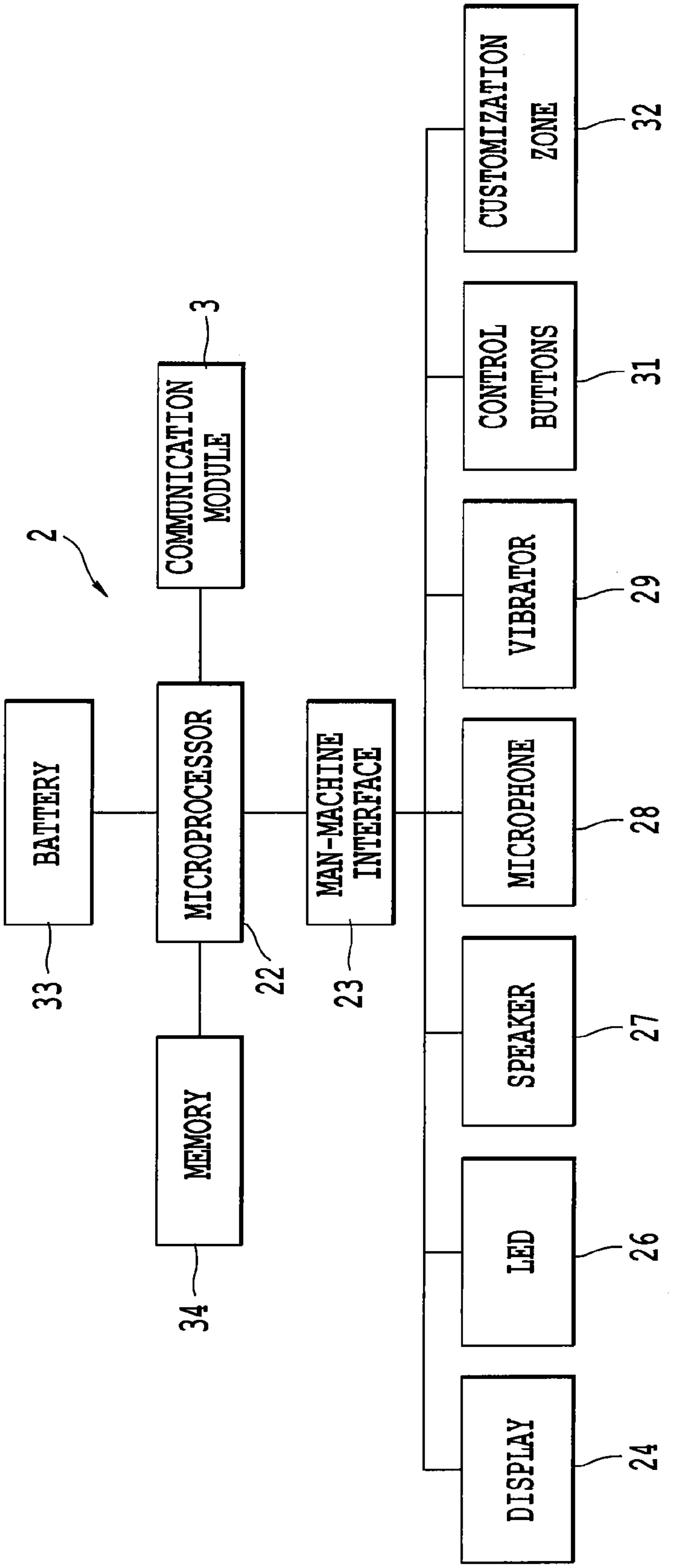
FIG. 4 represents an architecture of the data transmission, reception and storage device.

As shown in FIGS. 1 and 4, and according to the present invention, the communication means or module (3) of the device (2) enter into communication with two second off-board communication units. The first of the two second units is formed with a personal computer terminal of the user (17), of the PC or PDA or Smart phone or PND (Personal Navigation Device) type or any other intelligent personal portable object. The second of the two second communication units is formed by a terminal of the sales and after-sales network of the manufacturer (20) of the PC or PDA type. The terminal of the sales and after-sales network (20) communicates with the local server of this after-sales network, itself communicating with the professional interactive computer applications hosted in a server (18) of an information system, for example of the motor vehicle manufacturer. The terminal of the sales and after-sales network (20) also communicates with fleet management systems (19).

The terminals of the user and of the sales and after-sales network (17, 20) are connected to a computer network, such as for example the Internet. They use one or more wired technologies and/or one or more wireless technologies, in order to communicate with the device (2). The wired technologies are of the USB type, with a USB or Ethernet cable, or yet other cables. The wireless technologies are of the radiofrequency identification type (known under the abbreviation RFId), short-distance radio (known under the name "Bluetooth"), pulse-transmission radio modulation (known under the abbreviation UWB, "Ultra Wide Band"), wireless universal serial bus (known under the abbreviation WUSB, "Wireless USB"), or still other technologies. Other technologies may be used, of the wireless computer network technology type (known as Wifi), via the microwave wireless network standard (known under the abbreviation Wimax, "Worldwide Interoperability for Microwave Access"), and/or via still other technologies.

The user gains access to information and customized services in a dedicated service portal that can be accessed via the Internet. The service portal takes the form of an interactive computer application, hosted in a computer terminal or a server (18) of an information system for example of the motor vehicle manufacturer. The server (18) may also be connected to fleet management systems (19).

In a second embodiment (see FIG. 2), the device (2) is an onboard software application in a communicating personal object (17') such as a cellphone or a Smartphone or hosted on an application card designed to be received in a communicating personal object (17'). This application allows the communicating personal object to fulfill the functions described above, including also control of access to the vehicle and immobilizer.

In this embodiment, the device (2) enters into communication with a first communication unit onboard the vehicle (4) by using communication means or modules in wired (solid lines in FIG. 2) and/or wireless (dashed lines in FIG. 2) communication technology of a communicating personal object (17').

In this embodiment, the second data communication unit takes the form of a computer terminal (17) or a personal computer terminal (17') such as a communicating personal object. The device (2) via the communicating personal object (17') communicates directly with the reception means (35) via technologies of the second generation to fourth generation wireless type (known under the abbreviation 2G to 4G), of the 2.5G type with the general packet radio service (known under the abbreviation GPRS), of the 2.75G type with EDGE, "Enhanced Data Rates for Global Evolution", of the 3G type with the universal mobile telecommunications system (UMTS), of the 3.5G type with HSDPA, "High Speed Downlink Package Access", of the 4G type with OFDM, "Orthogonal Frequency Division Multiplexing". The reception means (35) then communicate with the server (18) of an information system, for example of the motor vehicle manufacturer via wired computer network technologies of the Ethernet type. The computer terminals (17) and (17') finally allow the user to access, via an Internet connection, the portal for services previously fed with the information transmitted to the server (18) by the communicating personal object (17'). The fleet management systems (19) also access the server (18).

Advantageously (see FIG. 3), the device (2) according to the first and second embodiment, or the first unit (4) of the vehicle themselves communicate information in an opportunist manner, that is to say that as soon as a communication is possible, with at least one wireless access point (21) and/or at least one node (21) of a mesh network belonging to an infrastructure via wireless computer network technologies such as Wifi, Wimax, as soon as the node or the access point (21) is detected. This infrastructure then communicates with the server (18) of an information system, for example of the motor vehicle manufacturer, by wired computer network technologies of the Ethernet type. In this case, the second data communication unit takes the form of a computer terminal (17). The user gains access to information and customized services in a dedicated service portal accessible via the Internet. The server (18) may also be connected to fleet management systems (19).

In all the embodiments, the communications of the system (1) are two-way, that is to say uplink, in the direction vehicle or first unit (4)—device (2)—user terminal (17, 17') and/or terminal of the sales and after-sales network of the manufacturer (20), and downlink, in the direction user terminal (17, 17') and/or terminal of the sales and after-sales network of the manufacturer (20)—device (2)—vehicle or first unit (4).

As shown in FIG. 4, a microprocessor (22) of this device (2) controls the communication module (3). The microprocessor (22) is connected to a man-machine interface (23), with a display (24), preferably of the LCD type, one or more light-emitting diodes known under the abbreviation LED (26), a speaker (27), a microphone (28), a vibrator (29), control buttons (31) and a customization zone (32).

The man-machine interface (23) of the device (2) makes it possible, for example, to provide the user with:

- information on the status of the vehicle (openings locked or unlocked),
- warnings (maintenance to be carried out, fuel level, expiry of rental contracts, and still other warnings),
- information concerning the location of the vehicle (for example in the form of a postal address),
- practical emergency information, configured via the service portal,
- voice memoranda (parking space, and still others), recorded via the microphone (28), and even music.

A battery (33) of the device (2) can be recharged via a wired connection (such as a computer bus used to connect computer peripherals to a computer for serial communication, otherwise called "USB"), to the computer terminals (17, 17', 20) or to the vehicle, or via its insertion into a possible vehicle drive (of the RFId type).

The device (2) is provided with a memory (34), designed to store all the data received from the first unit (4), from the computer terminals (17, 17', 20), from the user himself via the man-machine interface (23) and from a production line tool of the vehicle manufacturer. The capacity of the memory (34) is several hundred megabytes. The method for managing the data originating from and going to a motor vehicle, by means of the device (2), comprises several data storage steps, applied by the microprocessor (22) and the memory (34).

This memory (34) makes it possible to store permanently the data that technically define the vehicle, such as the vehicle identification number VIN.

This memory (34) can also be used to temporarily store information relating to the vehicle, such as the mileage, the levels, the defects displayed on the dashboard, and still others. This storage is carried out automatically, each time the ignition is switched "on" and "off" and without the intervention of the user. This information is of a kind to be transmitted directly by the user to the manufacturer's after-sales network via the terminal (20) or indirectly via the computer terminals (17, 17'). The transmission is made via the service portal on certain occasions, such as servicing or maintenance operations, special technical operations, repairs and still other operations. With this information, the vehicle repairer has access to a prediagnostic function of the vehicle.

This memory (34) makes it possible to temporarily store information relating both to the user and to the vehicle, such as name and address, settings, contracts, maintenance and service history, emergency information and still other information. This information is entered by the after-sales network, via the terminal (20) and by the user, via his PC (17) or his communicating personal object (17').

This memory (34) makes it possible to temporarily store information of the multimedia type (audio, video, pictures, etc.), intended for the vehicle, via the service portal or via the device (2) directly and to store in upward flow the state of these data in the vehicle.

Unlike a USB key, the integrity of the data stored in the device (2) is ensured by the prohibition of access to this memory (34). Specifically, the user cannot access it directly, but must go via his service portal to read, load and/or unload the information in his device (2).

The connection of this device (2) to the computer terminals (17, 17', 20) controls access to the data. The connection automatically initiates, via an automatic launch application, the opening of a window of the Internet browser with a display of the "identification/authentication" page of the user service portal. Entry of the identifier which corresponds to the vehicle identification number is automatically documented. The user then only has to enter his password.

This feature represents an enormous advantage in terms of convenience, reliability and ease of use. A second identifier physically entered into the device (2) and known to the system only (via the production line tool for example) and transparent to the user makes it possible to add an additional security point. It may be the number of the component designed to simplify the connections between electronic devices of the Bluetooth type or any other part making up the whole of the device (2).

In order to ensure the confidentiality of certain data, the latter are encrypted by the service portal or by the first unit (4) before being recorded in the device (2). They are then decrypted by the service portal or by the first unit (4) when they are transferred to the computer terminals (17, 17', 20) or the vehicle. This cryptographic principle in no way relates to the multimedia data. In addition, access to the immobilizer and access control functions is separate and protected from the other functions described.

Information transmitted in the downlink direction (terminal—device—vehicle), is: the transfer and display of itineraries, the loading and updating of information associated with the navigation system, with the address book, with the audio and video system, and with the Internet favorites, and any information that will enhance and facilitate its motoring use.

Information transmitted in the uplink direction (vehicle—device—terminal) is for example: the interpreted GPS position (postal address) of the vehicle, the voice-recorded reminders, the recording from the vehicle radio, the saving of new addresses and of itineraries, and the state of the data contained in the vehicle.

More precisely, the structure of the memory (34) of the device (2) and the steps for storage in the memory (34) of the data management method are established as follows.

A recording of the miles, the date and time, the inspections, the prediagnostics (for example the levels, the warnings and the defects), the status of the openings, the state of the functions (on/off), and the location of the vehicle, is applied, in upward flow, in a dynamic memory each time the vehicle stops or starts, this information being overwritten for some each time the vehicle stops or starts and stored for the rest.

A recording by etching of the vehicle's static data (such as the vehicle identification number) is applied, in downward flow, in a static/permanent memory via the production line tool and/or the network. The VIN is the result of the hard-wiring in a memory of said device (2) by a production line tool when the vehicle is manufactured.

A recording of the data relating to the main user of the device, such as his profile and his personal settings, is applied, in downward flow, in a temporary memory, via the service portal and the network, by the administrator. Reading of the data and use of the rights are restricted to the main user of the device.

Recording of the data relating to the other users of the device, with their profile or profiles, is applied, in downward flow, in a temporary memory, via the service portal and the network. Reading of the data and use of the rights are restricted to the other users of the device. Recording of the vehicle contracts taken out is applied, in downward flow, in a temporary memory, via the service portal and the network terminal, by the administrator and/or the after-sales network.

Recording of a history of the warnings/defects, with the mileage, the date and time and the warning(s)/defect(s) is applied, in upward flow, in a vehicle history memory, each time a warning appears. Recording of a history of servicing operations is applied in downward flow in a vehicle history memory, by the network, each time the vehicle is serviced. Recording of a history of repairs is applied, in downward flow, in a vehicle history memory, by the network, each time a repair is made, but agreed by the vehicle owner.

Recording of the data, which may for example be of the video, audio, text or image type such as the itineraries, and which is interacting with the navigation systems, the audio or video systems, and the onboard computer in order to carry out updates and corrections of onboard software and load/display various information, occurs in a downward and upward flow in a buffer memory.

By the intentional data transfer between the equipment of the vehicle and the user service portal, this device (2) makes it possible to provide new functionalities in the vehicle. These functionalities vary depending on the equipment present in the vehicle of the user.

Settings of the vehicle and configurations are customized through the service portal. The device (2) therefore contains customized vehicle settings. Some are adjusted by the user and then stored directly in the vehicle, such as for example the settings of the driver's seat, the internal and external rearview mirrors. But the device (2) makes it possible to transfer other settings which have been configured in a more user-friendly manner via the service portal. These are, for example, the radio stations, the air-conditioning temperature, and still others.

If the vehicle is fitted with a screen (13), the user may display itineraries, practical information, reminders previously transferred by the device (2) from the service portal. He may then navigate in this set of information via the man-machine interface of the vehicle (12).

For the practical information function, offboard and in the service portal, the user configures practical information, such as telephone numbers, and loads them into his device (2). He has them available in case they are needed on the device (2), via the display or in the vehicle, via the dashboard screen (13).

If the vehicle is fitted with an MP3 audio system, the system offers three music functions. For the first music function, offboard and in the service portal, the user loads audio files (of the MP3 type) into the communicating-memory device (2) and then transfers them to the vehicle. They may be stored in the vehicle, if the latter is fitted with a hard disk or they may be read, thanks to the principle allowing the reading of an audio or video stream, as it is broadcast, directly from the device (2) via the audio equipment (9).

For the second music function, in the vehicle, the user can record the radio when he wishes to via the man-machine interface of the vehicle (12). The recording is stored in the device (2) and can then be transferred to the user's personal computer and saved therein.

For the third music function, in the vehicle, the user can, when he listens to the radio, record in the device (2) the references of a song (name of the singer, song title) that he likes via the man-machine interface of the vehicle (12). He can then read these same references offboard via the service portal.

If the vehicle is fitted with an audio system (9), a microphone (15) a voice recognition and synthesis system and the dashboard screen (13), the system offers two storage functions. For the first storage function, offboard and via the service portal or directly on the device (2), the user records a voice or text reminder, for example to remember the location of his vehicle. He may then consult this reminder in the vehicle via the audio equipment (9) and on the dashboard screen (13) or directly via the man-machine interface of the device (23), display (24) or speaker (27) of the device (2).

For the second storage function, in the vehicle, the user records in the device (2) a voice or text reminder, via the microphone (15) or voice synthesis. He can then consult it in the service portal, in text mode, via voice recognition, or directly via the man-machine interface of the device (23).

If the vehicle is fitted with a video system (11), the system offers a video function. In the service portal, the user loads video files (for example compressed according to the MPG2 format) into the device (2) and then transfers them to the vehicle. They may be stored in the vehicle, if the latter is fitted with a hard disk, or read (by streaming) directly on the device (2) via the video system (11).

If the vehicle is fitted with a navigation system (8), the system offers four navigation functions and one location function. For the first navigation function, offboard and in the service portal, the user loads a destination into the device (2) and then transfers it to the navigation system (8), for a single use. The user benefits from a more user-friendly interface from his terminal (17) in order to prepare his journey and to upgrade the information of his navigation system with data available via the Internet.

For the second navigation function, offboard, the user may load, update and save his navigation address book in the service portal. This function is particularly useful when the user changes vehicle. He then does not need to reenter the whole of his address book into the navigation system (8) of his new vehicle.

For the third navigation function, in the vehicle, the user may record in the device (2) an itinerary made with points of interest (known under the abbreviation POI) or any other associated upgraded information via a man-machine interface of the vehicle. The recording can then be transferred and saved in the computer terminals (17, 17'), in order to be able to reuse this itinerary or to send it in order to share it with other people.

For the fourth navigation function, offboard, in the service portal, the user loads an update of the mapping, of his points of interest such as parking places, service stations, the location of radars or information suitable for improving the safety of his trip and then transfers it to the navigation system (8).

For the location function, at each stop, the vehicle records its GPS position, translated into a parking address of the vehicle (postal address), in the device (2). The user may thus read it afterwards, via the man-machine interface of the device (23), via a communication with a telephone, via a terminal or the service portal, in order to rapidly find his vehicle again.

If the vehicle is fitted with a navigation system without onboard maps, i.e. with a "hybrid navigation", there is a navigation function. Offboard, in the service portal, the user loads the mapped zone enhanced with POIs corresponding to his itinerary into the device (2) and then transfers it to the vehicle in order to display it on the dashboard screen (13). This function has the advantage of preventing the various drawbacks of an onboard mapping system.

In certain situations and after indication of a vehicle problem by the user, this device (2) may be programmed via the manufacturer network in order to trace and archive certain vehicle data for a given period. The latter may then be stored in the device (2) and sent via the service portal to the network to be analyzed.

Software programs onboard the vehicle are also able to be downloaded in order to be regularly updated, in the event of a recall campaign, following a new regulation (antipollution for example), an online diagnosis, the acquisition by the user of a new item of equipment and yet other events. Via the service portal, the network of the manufacturer may provide the users with the latest versions, corrections, updates or new onboard software programs, in order to transfer them via the device (2) by making use of the identification/authentication system.

It should also be noted that at least two devices (2) are recognized by the first communication unit onboard the vehicle (4), by the second communication unit, in the form of the user terminal (17) and/or of the sales and after-sales network terminal of the manufacturer (20), by the server of the manufacturer's information system (18) and by the server of the fleet management system (19).

According to an important aspect of the invention in all the embodiments, the at least two data transmission, reception and storage devices (2) are capable of systematically synchronizing data that have become obsolete that are neither customized nor archived, by comparison of the data contained in the at least two data transmission, reception and storage devices (2), in the first communication unit (4) and in the second communication unit (17), said synchronization being applied by the first communication unit (4), by the second communication unit (17), or directly between them by a communication being set up as soon as one of the at least two devices (2) detects another in its environment. It should be noted that the concept of proximity depends on the technology used, Wifi, Bluetooth, NFC (Near Field Communication), or yet other technologies.

Said synchronization occurs by comparison of the data sets, each set being characterized by the associated timestamp and/or mileage data. It should be noted that synchronization comprises both the upgrading and the updating of the data. For example, a user having a key capable of operating with this system can update and upgrade a new software version or new data of his navigation system simply by connecting with this key to the interactive computer application without worrying about knowing whether the version proposed by the interactive computer application is the latest relative to that of his vehicle.

Said synchronization is applied by comparison of the data sets, each set being characterized by the associated timestamp and/or mileage data. It should be noted that synchronization comprises both the upgrading and the updating of the data. For example, a user having a key capable of operating with this system can update and upgrade a new software version or new data of his navigation system simply by connecting with this key to the interactive computer application without worrying about knowing whether the version proposed by the interactive computer application is the latest relative to that of his vehicle.

The data transmission, reception and storage devices (2) thus operate as media for the synchronization of the whole system and are themselves beneficiaries of the synchronization. The synchronization therefore allows the user of the system to always have the most comprehensive and most up-to-date information, irrespective of the data transmission, reception and storage device (2) used.

Therefore, a user will not have to worry about updating a key that he has not used for a long time; the latter will be automatically updated by the vehicle, by the other key, or during a connection to the interactive computer application.

The invention claimed is:

1. A system for managing data originating from and going to a motor vehicle, comprising:

a first data communication unit permanently placed onboard the vehicle;

a second data communication unit at a distance from said vehicle; and at least two devices for transmitting, receiving and storing data originating from and going to said vehicle, the at least two devices for transmitting, receiving, and storing data being separate and distinct devices from the vehicle, and including:

a data communication module configured to communicate with the first data communication unit and with the second data communication unit, an interface for communicating with a user of said vehicle, and a memory for storing the data, the second data communication unit being a computer terminal connected to a computer network, the Internet, and/or an Intranet, providing access to an interactive computer application, so as to send data originating from the vehicle and to receive said data going to the at least two devices for transmitting, receiving, and storing data from the vehicle, wherein the at least two devices for transmitting, receiving, and storing data are configured to synchronize noncustomized data that have become obsolete, by comparing data contained in the at least two devices for transmitting, receiving, and storing data, in the first data communication unit and in the second data communication unit, said synchronization being performed either by the first data communication unit or by the second data communication unit, or directly between the first data communication unit and the second data communication unit by communication being set up as soon as one of the at least two devices for transmitting, receiving, and storing data detects the other of the at least two devices for transmitting, receiving, and storing data in its environment.

2. The system as claimed in claim 1, further comprising an access unit from the at least two devices for transmitting, receiving, and storing data to the second data communication unit provided by an identified and authenticated connection allowing access to the interactive computer application controlled by the manufacturer so that a user reads, loads and/or unloads said data from the at least two devices for transmitting, receiving, and storing data via a service portal.

3. The system as claimed in claim 1, wherein connection of the at least two devices for transmitting, receiving, and storing data to the second data communication unit automatically initiates the launching of the interactive computer application hosted in the server and accessible from the second data communication unit and is applied by automatic documentation of at least one identifier, that of the vehicle, and wherein a password associated with a user has to be entered to authenticate the user's right of access to the interactive computer application controlled by the manufacturer.

4. The system as claimed in claim 1, wherein the transmission and reception of the data between the at least two devices for transmitting, receiving, and storing data and the second data communication unit is performed at a distance from the vehicle automatically without an intentional connection of the at least two devices for transmitting, receiving, and storing data, or by a wireless access point or a node of a mesh network.

5. The system as claimed in claim 1, wherein the second data communication unit uses at least two data protection means independent of one another, the first means being a vehicle identifier etched in the memory of the at least two devices for transmitting, receiving, and storing data and the second means being a physical identifier of at least one part of the at least two devices for transmitting, receiving, and storing data etched in the memory of the least two devices for transmitting, receiving, and storing data.

6. The system as claimed in claim 1, wherein integrity of the data stored in the at least two devices for transmitting, receiving, and storing data is ensured by prohibition of direct read and write access to the data storage means.

7. The system as claimed in claim 1, wherein the at least two devices for transmitting, receiving, and storing data are an onboard software application in a communicating personal object, forming the second data communication unit, or hosted on an application card designed to be received in a communicating personal object of the cellphone type, said application allowing the communicating personal object control of access to the vehicle and of an immobilizer.

8. The system as claimed in claim 1, wherein the at least two devices for transmitting, receiving, and storing data or the first data communication unit of the vehicle communicate information, with at least one wireless access point and/or at least one node of a mesh network belonging to an infrastructure via wireless computer network technologies, as soon as communication is possible and the node or the access point is detected, the second data communication unit thus gaining access to the information and to a service portal hosted in a server via an Internet connection.

9. The use of a system as claimed in claim 1, wherein a vehicle fleet management system is supplied with the data originating from said connections of the at least two devices for transmitting, receiving, and storing data to an interactive computer application intended for users or for managers of a vehicle fleet or to any other terminal connected to a fleet management system.

10. The system as claimed in claim 1, wherein, based on the data supplied by an interactive computer application hosted in a server, updating onboard systems, or latest update versions of the onboard software originating from the manufacturer's after-sales network or from the manufacturer itself, or a software program of a computer or of a navigation system.

11. The system as claimed in claim 1, wherein the at least two devices for transmitting, receiving, and storing data include a speaker.

12. The system as claimed in claim 11, wherein the at least two devices for transmitting, receiving, and storing data include a microphone.

13. A method for managing data originating from and going to a motor vehicle, by at least two devices for transmitting, receiving, and storing data, comprising:

providing the at least two devices for transmitting, receiving and storing data originating from and going to said vehicle, the at least two devices for transmitting, receiving, and storing data being separate and distinct devices from the vehicle;

transmitting and receiving data with the at least two devices for transmitting, receiving, and storing to and from a first data communication unit permanently placed onboard the vehicle, causing an interactive computer application hosted in a server to be launched automatically by the at least two devices for transmitting, receiving, and storing data, that can be accessed by a second communication unit of said data, that is at a distance from said vehicle and connected to a computer network;

transmitting and receiving said data with said at least two devices for transmitting, receiving, and storing data data transmission, reception and storage device to and from the second data communication unit, by the interactive computer application;

causing said data to be processed by said interactive computer application; and storing with said at least two devices for transmitting, receiving, and storing data the data received from the first and the second data communication unit, wherein the at least two devices for transmitting, receiving, and storing data are configured to synchronize noncustomized data that have become obsolete, by comparing data contained in the at least two devices for transmitting, receiving, and storing data, in the first data communication unit and in the second data communication unit, said synchronization being performed either by the first data communication unit or by the second data communication unit, or directly between the first data communication unit and the second data communication unit by communication being set up as soon as one of the at least two devices for transmitting, receiving, and storing data detects the other of the at least two devices for transmitting, receiving, and storing data in its environment.

14. The method as claimed in claim 13, wherein, to ensure confidentiality of the data concerning the vehicle, said data are encrypted by a service portal or by the first data communication unit before being recorded in said at least two devices for transmitting, receiving and storing data.

15. The method as claimed in claim 14, wherein said data are decrypted by the service portal controlled by the manufacturer or by the first data communication unit when they are transferred to the second data communication unit or to the vehicle.

16. The method as claimed in claim 13, wherein the storing in the at least two devices for transmitting, receiving, and storing data of dynamic data received from the first data communication unit occurs in a memory of said at least two devices for transmitting, receiving, and storing data on each stop and/or start of the vehicle or while the vehicle is traveling, and the data can include mileage traveled by the vehicle, date and time, starting and stopping of the engine, levels, warnings and defects, wear of components, status of openings, customized states and settings of the functions of the vehicle, GPS (Global Position Satellite) position or location of the vehicle in an infrastructure or any other information capable of changing over time and concerning the vehicle or the vehicle's environment.

17. The method as claimed in claim 13, wherein the storing in the at least two devices for transmitting, receiving, and storing data of static data received from the second data communication unit or from a production line tool occurs in a memory of said at least two devices for transmitting, receiving, and storing data, and the data can include technical, commercial and legal characteristics of the vehicle.

18. The method as claimed in claim 13, wherein the storing in the at least two devices for transmitting, receiving, and storing data of temporary data received from the second data communication unit is applied in a memory of said at least two devices for transmitting, receiving, and storing data, by an interactive computer application, and the data can include settings associated with the vehicle or service contracts taken out for the vehicle.

19. The method as claimed in claim 13, wherein the storing in the at least two devices for transmitting, receiving, and storing data of data received from the first data communication unit occurs in a memory of said at least two devices for transmitting, receiving, and storing data for creating a history thereof, on each appearance, and the data can include history of the warnings and defects associated with the date, time and mileage data.

20. The method as claimed in claim 13, wherein the storing in the at least two devices for transmitting, receiving, and storing data of data received from the second data communication unit occurs in a memory of said at least two devices for transmitting, receiving, and storing data for the purpose of making a history thereof

21. The method as claimed in claim 13, wherein the storing in the at least two devices for transmitting, receiving, and storing data of buffer data received from the first and the second data communication unit occurs in a memory of said at least two devices for transmitting, receiving, and storing data by an interactive computer application, and the data can include video, audio, text, image of itineraries, navigation systems, audio or video systems, updates and corrections of onboard software programs, and practical information.

* * * * *